United States Patent Office 3,417,053
Patented Dec. 17, 1968

3,417,053
MOISTURE-CURABLE ALKOXYSILYL SUB-
STITUTED POLYPHENYLENE ETHERS
Alan J. Chalk, Scotia, N.Y., assignor to General Electric
Company, a corporation of New York
No Drawing. Filed Oct. 5, 1967, Ser. No. 672,960
9 Claims. (Cl. 260—47)

ABSTRACT OF THE DISCLOSURE

Alkali metal-substituted polyphenylene ethers react readily with alkoxymonohalosilanes to produce polyphenylene ethers having alkoxysilyl substituents. These alkoxysilyl substituted polyphenylene ethers are very sensitive to water or water vapor even at ambient temperatures forming cross-linked, cured polymers. These compositions therefore form a new class of what is known in the art as room-temperature vulcanizable (RTV) compositions. Since the alkoxysilyl substituted polyphenylene ethers are solids at room temperature, they are used in solution in an anhydrous solvent to form films, fibers, foils or coatings which on evaporation of the solvent rapidly cure on exposure to water either in the form of liquid or vapor or a gas containing moisture, for example, humid air. The shaped article is no longer soluble in solvents in which it was initially soluble. These cured compositions, likewise, are no longer fusible and therefore may be exposed to higher temperature than the initial polyphenylene ethers from which they were prepared without danger of flowing.

---

This invention relates to alkoxysilyl substituted polyphenylene ethers and to a process of producing the same. More particularly this invention relates to alkoxysilyl substituted polyphenylene ethers, especially those in which the preponderant repeating unit of the polymer molecule is a 1,4-phenylene ether unit, and to a process of producing the same.

Polyphenylene ethers, as a general class, are an extremely interesting group of new polymers. These polymers and processes of producing them are disclosed in U.S. Patents 3,256,243, 3,257,357, 3,257,358, 3,306,874 and 3,306,875. In the copending application, Ser. No. 673,021, Allan S. Hay, filed concurrently herewith, and assigned to the same assignee as the present invention, there is disclosed and claimed alkali metal-containing polyphenylene ethers, hereinafter called metalated polyphenylene ethers, and a process of producing the same. These metalated polyphenylene ethers have repeating units having at least one of the formulas

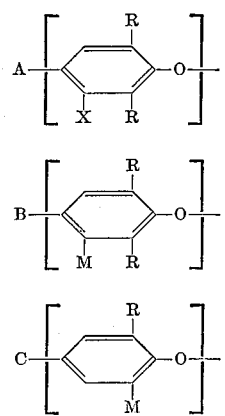

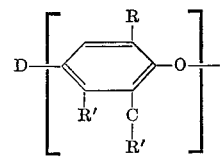

where X is selected from the group consisting of hydrogen and halogen, each R is independently selected from the group consisting of hydrogen, halogen, alkyl free of a tertiary α-carbon atom and aryl, R' is independently selected from the group consisting of hydrogen, alkyl and aryl, and M is an alkali metal with the proviso that M in formulas B and C is lithium when R of the same formulas is alkyl, there being at least one of the metal containing units in the polymer molecule and at least 10 repeating units in the polymer molecule. Any remaining units of the polymer will be polyphenylene units, similar to the above, but joined through the ortho position rather than the para position when R in any of the above formulas which is substituted directly on the phenylene nucleus is hydrogen or halogen. Such units would be only a minor amount of the units present in the polymer. Preferably the polymer is made up of only the units represented by formulas A, B, C, and D and any alkyl and aryl substituents have no more than 20 carbon atoms.

X is the above formula in addition to hydrogen may be any halogen, for example, chlorine, bromine or iodine. If X is halogen, it is preferably chlorine, since it is the cheapest and most readily available halogen. R in the above formula, in addition to being the same as X, may be alkyl free of a tertiary α-carbon atom, including aryl substituted alkyl, examples of which are methyl, ethyl, propyl, isopropyl, butyl, secondary butyl, hexyl, cyclohexyl, heptyl, octyl, decyl, octadecyl, etc., benzyl, phenylethyl, naphthylmethyl, phenylpropyl, tolylmethyl, xylylethyl, etc., aryl including alkyl substituted aryl, examples of which are phenyl, tolyl, xylyl, naphthyl, methylnaphthyl, ethylnaphthyl, ethylphenyl, biphenylyl, terphenylyl, etc. Additional examples of substituents which R may be, are those alkyl substituents free of a tertiary α-carbon atom and aryl substituents disclosed as substituents on the starting phenols and polyphenylene ether products in the above-identified U.S. patents and copending application which are incorporated into this application by reference.

I have now found that the alkali metal atom of these polyphenylene ethers readily react with alkoxymonohalosilanes to introduce alkoxysilyl substituents on the polyphenylene ethers, at the positions where the alkali metal (M) appears in the above formulas for the metalated polyphenylene ethers. I have further found that these alkoxysilyl groups are extremely sensitive to water, whereby the alkoxy group is hydrolyzed to a silanol group, which then readily reacts with the silanol substituent on another polyphenylene ether chain to produce a siloxane cross-link between the two polymer chains. I have further determined that in order that the final moisture-cured product have sufficient strength to be useful, that the molecular weight of the cross-linked polymer should be at least 10,000. Furthermore, I have determined that the alcohol produced by the hydrolysis of the alkoxy group should be volatile at ambient conditions. Therefore, the alkoxy group should have from 1 to 3 carbon atoms, i.e., methoxy, ethoxy, n-propoxy or sec-propoxy, i.e., the corresponding alcohol produced will be methanol, ethanol, n-propanol or isopropanol. Each silyl group should contain at least one such alkoxy group, any remaining substituents on the silicon atom should be hydrogen, $C_{1-6}$ alkyl or phenyl.

This means that the alkoxymonohalosilanes which are reacted with the alkali metal-containing polyphenylene ethers can be represented by the formula

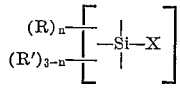

where X is halogen, R is $C_{1-3}$ alkoxy, R' is hydrogen, $C_{1-6}$ alkyl or phenyl and $n$ is 1 to 3. R can be methoxy, ethoxy, n-propoxy and isopropoxy and R' in addition to being hydrogen and phenyl can be methyl, ethyl, propyl, isopropyl, butyl, isobutyl, t-butyl, the various amyl isomers, the various hexyl isomers, including cyclohexyl, etc. The most readily available and preferred alkoxymonohalosilanes are those where R is methoxy, R' is hydrogen, methyl or phenyl and X is chlorine.

I have further determined that in order for the polymer to become sufficiently cross-linked that it becomes insoluble in solvents, that there should be an average of at least one silyl substituent on every 100 repeating polyphenylene ether groups in the polymer. I have further determined that in the reaction of the alkoxymonohalosilane with the metalated polyphenylene ether, that if more than an average of one alkoxysilyl substituent is introduced for each 10 repeating polyphenylene ether units in the polymer that the polymer becomes insoluble probably because a secondary cross-linking reaction occurs between an alkoxy group on one polymer molecule and an alkali metal substituent on another polymer molecule. Therefore, the useful compositions of my invention have an average of one

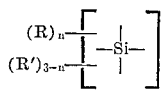

substituent for each 10 to 100 repeating polyphenylene ether groups in the polymer, where R, R' and $n$ are as defined above.

Since one alkoxysilyl substituent is introduced on the polyphenylene ether for each alkali metal substituent on the starting metalated polyphenylene ether, the metalated polyphenylene ether used to prepare the substituted silyl polymers should have an average of one alkali metal-containing repeating unit for each 10 to 100 repeating polyphenylene ether units in the polymer.

The polyphenylene ethers are readily metalated by reacting them with an alkali metal alkyl or alkali metal aryl. This reaction is generally carried out in a solution in which both polyphenylene ether and the metalating agent is soluble. However, it is possible to carry out the reaction in a heterogeneous system, where either the alkali metal alkyl or aryl is insoluble and the polyphenylene ether is soluble or vice-versa. In the latter reaction, generally, only the surface of the polyphenylene ether is metalated to a depth penetrated by the solution of the metalating agent. As would be expected, this reaction proceeds at a lower rate than when both reactants are dissolved in a mutual solvent. In this way, it is possible to metalate only the surface of a shaped article made of the polyphenylene ether. Such a surface of the metalated polyphenylene ether can be reacted with the alkoxymonohalosilane to produce a shaped article, for example, a molded object, filament, fiber, film, etc., which is thereafter, able to be cured with moisture to produce a shaped article having only the surface of the object rendered insoluble and infusible. By such a technique, therefore, it is possible to produce, for example, fabrics from fibers of polyphenylene ethers which have only an insoluble and infusible surface, but the entire fabric is rendered resistant to solvents, for example, dry cleaning solvents.

Whether or not the metalated polyphenylene ether is in solid form or in solution, it readily reacts with the alkoxymonohalosilane to product the desired alkoxysilyl substituted polyphenylene ether. The alkoxymonohalosilanes are readily soluble in all of the solvents used in metalating the polyphenylene ethers as well as many solvents in which the polyphenylene ether is not soluble, e.g., ethers, etc. Therefore, if the solution technique is used in preparing the metalated polyphenylene ethers, these solutions may be reacted directly with the alkoxymonohalosilanes without the necessity for separating the metalated polyphenylene ether from its reaction solution.

The reaction of the metalated polyphenylene ether with the alkoxymonohalosilane proceeds extremely rapidly at room temperature, generally in the matter of a few minutes, so that there is no necessity for either using heat, pressure or cooling during the reaction. However, such procedures can be used if so desired. Somewhat longer times are required if the metalated polyphenylene ether is not in solution. No harm is caused by the use of longer times. The halo substituent on the alkoxymonohalosilane and the alkali metal substituent on the metalated polyphenylene ether react to form the corresponding alkali metal halide with the alkoxysilyl moeity replacing the alkali metal as the substituent on the polyphenylene ether. The salt is readily removed by filtration, centrifugation or other means of removing a solid from a liquid when the reaction is carried out in a mutual solvent for both reactants or washed from the surface after curing when the polyphenylene ether was reacted in the solid state. Since the particular halogen of the alkoxymonohalosilane does not appear in the final polymer, it is preferred that this halogen be chlorine, since it is most readily available and cheapest to use. However, it may be any of the other halogens, if so desired.

When the polyphenylene ether has been metalated to give the desired degree of metalation that the reaction with the alkoxymonohalosilane will produce the required average of one alkoxysilyl group for each 10 to 100 repeating units in the polyphenylene ether, the reaction is readily followed since the metalated polyphenylene ether is highly colored in the solution, but the solution of the alkoxysilylated polyphenylene ether is colorless. Some minor impurities may cause the solution to be slightly yellow. Therefore, the reaction may be readily followed by noting when the color is completely or essentially discharged. When this technique is used, an excess of the alkoxymonohalosilane can be added, but would serve no useful purpose other than to insure complete reaction of all of the alkali metalated polymer.

Since the metalated polyphenylene ethers are extremely reactive themselves with moisture, carbon dioxide and oxygen, the preparation of the metalated polyphenylene ethers is always carried out in an inert atmosphere using anhydrous reagents. This inert atmosphere is likewise maintained until the metalated polyphenylene ether has reacted with the alkoxymonohalosilane. Thereafter, the alkoxysilyl polyphenylene ether does not need to be protected from carbon dioxide and oxygen, but should be protected against contact with moisture or water in any form, until it is desired to cause the curing and cross-linking of the product.

The alkoxysilylated polyphenylene ethers are readily soluble in a wide variety of solvents, which are capable of being made anhydrous and which do not readily dissolve in water. The solvents are generally aromatic hydrocarbon liquids, for example, benzene, toluene, xylene or, liquid halogenated aliphatic hydrocarbons such as chloroform, dichloroethane, tetrachloroethane, etc. They are also soluble in solvents, for example, tetrahydrofuran, which are readily miscible with water. Both the liquid aromatic hydrocarbons and tetrahydrofuran are solvents which are generally used in making the metalated polyphenylene ethers. These solvents, therefore, are particularly suitable for use when it is desired to carry out the metalation of the polyphenylene ether and then the preparation of the alkoxysilyl substituted polyphenylene ether without isolating the polymer from solution. Tetrahydrofuran would be particularly useful where it is desired to solution spin a fiber from a solution of the alkoxysilyl substituted polyphenylene ether, which is then passed through an aqueous bath or a moist atmosphere to coagulate and at the same time cure and cross-link the polymer in its fiber form.

In order that those skilled in the art may better understand my invention, the following examples are given by way of illustration and not by way of limitation. In the examples, all percentages and parts are by weight unless stated otherwise.

Example 1

A solution of 1 g. of poly(2,6-dimethyl-1,4-phenylene ether) in 20 ml. of benzene was prepared under nitrogen to which 0.2 ml. of 1.6 M butyl lithium in hexane and 0.05 ml. of tetramethylethylenediamine were added. This amount of butyl lithium was sufficient to supply 1 lithium atom for each 25 repeating polyphenylene ether units in the polymer. The metalation reaction was allowed to proceed for 1 hour at room temperature, after which, 0.05 ml. of dimethoxychlorosilane was added, which was sufficient to supply 1 silicon atom for each lithium atom in the polymer. This reaction was very rapid at room temperature as was evident by the color of the metalated polymer disappearing and the formation of the precipitate of lithium chloride. The solution was centrifuged under nitrogen to remove the lithium chloride. A film was cast from this solution and the solvent evaporated. The film so obtained was found to have been cross-linked by the moisture present in the air producing a tough film which was now insoluble in benzene and other solvents capable of dissolving the initial polyphenylene ether.

Cross-linked insoluble films are also obtained from solutions of the alkoxysilyl substituted polyphenylene ethers obtained when an equivalent amount of poly(1,4-phenylene ether) is used in place of the poly(2,6-dimethyl-1,4-phenylene ether) and also when an equivalent amount of the following monohalosilanes are substituted for the dimethoxychlorosilane in the above example: methoxychlorosilane, trimethoxychlorosilane, dimethoxybromosilane, methoxyiodosilane, methyloxyiodosilane, ethoxychlorosilane, methoxyethoxychlorosilane, n-propoxychlorosilane, iso-propoxychlorosilane, dimethylmethoxychlorosilane, methyldimethoxybromosilane, dimethoxyphenylchlorosilane, methoxydiphenylbromosilane, dimethoxypropylchlorosilane, dimethoxybutylchlorosilane and methoxychlorosilane. Likewise, moisture curable compositions are obtained when any alkoxymonohalosilane corresponding to the previously given formula is used in place of the dimethoxychlorosilane and any polyphenylene ether corresponding to the previously given formula are used in the above example.

Example 2

When Example 1 was repeated but increasing the amount of butyl lithium to produce a ratio of one lithium atom for each 10 polyphenylene ether units in the polymer, there was a tendency for the polymer to form an insoluble gel when reacted with the dimethoxychlorosilane. This tendency to form a gel is decreased by use of several techniques, i.e., by using only a monomethoxychlorosilane since it appears that the cross-linking is due to some of the methoxy groups as well as the chlorine reacting with the alkali metal. Increasing the activity of the halogen, i.e., by the use of iodine or bromine in place of chlorine in the alkoxyhalosilane also decreases the tendency to react with the alkoxy group. Another technique is to use a higher alkoxy and especially a branched chain alkoxy, i.e., isopropoxy in place of the methoxy halosilane.

Example 3

When Example 1 was repeated decreasing the amount of butyl lithium used, so that the ratio was one lithium atom per 100 repeating units of the polyphenylene ether, the polymer obtained by reaction with dimethoxychlorosilane is borderline with regards to being rendered insoluble in solvents, after reaction with moisture. In this case, the use of a trimethoxychlorosilane to produce trimethoxysilyl groups on the polyphenylene ether aids in producing a higher degree of cross-linking.

Example 4

A solution of 1 g. of poly(2,6-diphenyl-1,4-phenylene ether) in 50 ml. of tetrahydrofuran was reacted with 0.25 ml. of a 1.6 M solution of butyl lithium in hexane at 25° C. When this lithiated polymer is reacted after one hour with dimethoxychlorosilane to convert the lithium substituent on the polymer to dimethoxysilyl substituents, the polymer solution so obtained can be cast into films which are readily converted to insoluble and infusible state when exposed to moist air. Since the tetrahydrofuran is readily soluble in water, the solution may likewise be spun through a spinneret into either water or an aqueous alcohol solution or into moist, hot air to produce a fiber which is cross-linked and no longer soluble in tetrahydrofuran or other solvents in which polyphenylene ethers are soluble. Similar results are likewise obtained when an equivalent amount of poly(2-methyl-6-phenyl-1,4-phenylene ether) is used in place of the poly(2,6-diphenyl-1,4-phenylene ether). In a similar manner, other polyphenylene ethers may be metalated and thereafter reacted to produce the corresponding alkoxysilyl substituted polyphenylene ethers which likewise are converted by moisture to the insoluble and infusible state.

As the above examples illustrated, the alkoxysilyl substituted polyphenylene ethers produced by my process have a wide variety of uses, for example, in the making of films and fibers, which are cross-linked when they are exposed to water either in a liquid or vapor form to render them insoluble in solvents in which they previously were soluble. The fibers so produced can be woven into cloth or other fabric forms to produce material which is highly resistant to dry-cleaning solvents. The films may be used as slot insulation in motors or the solution of the alkoxysilylated polymer may be coated onto electrical conductors which are thereafter exposed to moisture, to produce a cross-linked insulation on the electrical conductor.

In the foregoing discussion and examples, various modifications have been disclosed. Obviously, other modifications and variations of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. A moisture-curable composition comprising a poly (1,4-phenylene ether) having a number average molecular weight of at least 10,000 and having an average of one

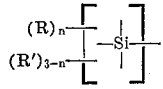

substituent for each 10 to 100 repeating phenylene ether groups in the polymer, where R is $C_{1-3}$ alkoxy and R' is hydrogen, $C_{1-6}$ alkyl or phenyl and $n$ is 1 to 3.

2. The composition of claim 1 where R is methoxy and R' is hydrogen, methyl or phenyl.

3. The composition of claim 1 where R is methoxy and R' is hydrogen.

4. The composition of claim 1 where R is methoxy and R' is methyl.

5. The composition of claim 1 where R is methoxy and R' is phenyl.

6. The composition of claim 1 wherein the poly(1,4-phenylene ether) is a poly(2,6-dimethyl-1,4-phenylene ether), R is methoxy and R' is hydrogen, methyl or phenyl.

7. The composition of claim 1 wherein the poly(1,4-phenylene ether) R is methoxy and R' is hydrogen, methyl or phenyl.

8. The composition of claim 1 wherein the poly(1,4-phenylene ether) is a poly(2,6-diphenyl-1,4-phenylene ether), R is methoxy and R' is hydrogen, methyl or phenyl.

9. The process of producing the composition of claim 1 which comprises reacting a solution of a poly(1,4-phenylene ether) having an average of one alkali metal substituent for each 10 to 100 phenylene ether groups and a number average molecular weight of at least 10,000 with an alkoxyhalosilane having the formula

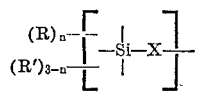

where X is halogen, R is $C_{1-3}$ alkoxy, R' is hydrogen, $C_{1-6}$ alkyl or phenyl and $n$ is 1 to 3, and thereafter removing the precipitated alkali metal halide from the reaction mixture.

No references cited.

WILLIAM H. SHORT, *Primary Examiner.*

M. GOLDSTEIN, *Assistant Examiner.*

U.S. Cl. X.R

260—30.4, 33.6, 33.8, 46.5, 824